Sept. 27, 1938. E. H. KING 2,131,402
LOGGING APPARATUS
Filed Nov. 5, 1937 3 Sheets-Sheet 1
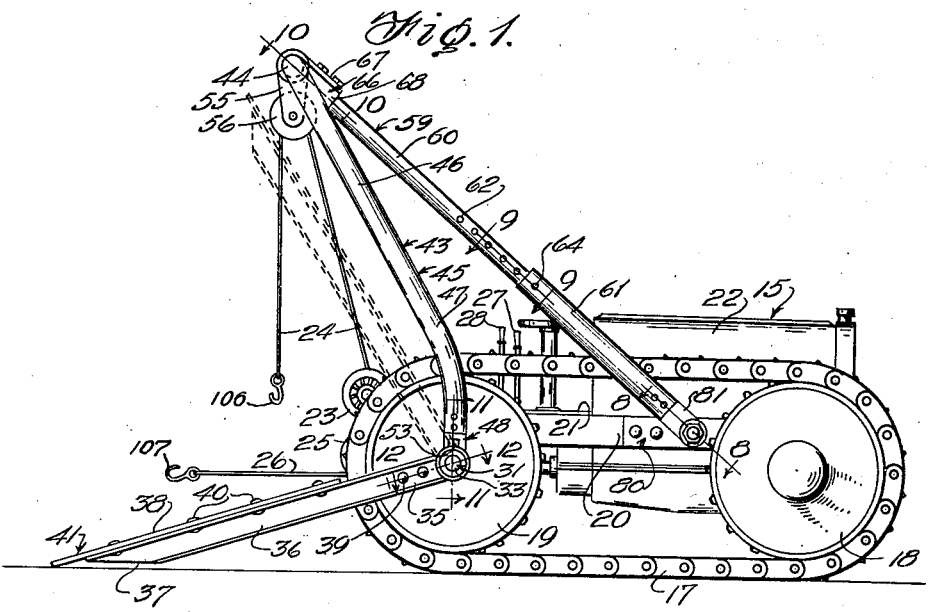
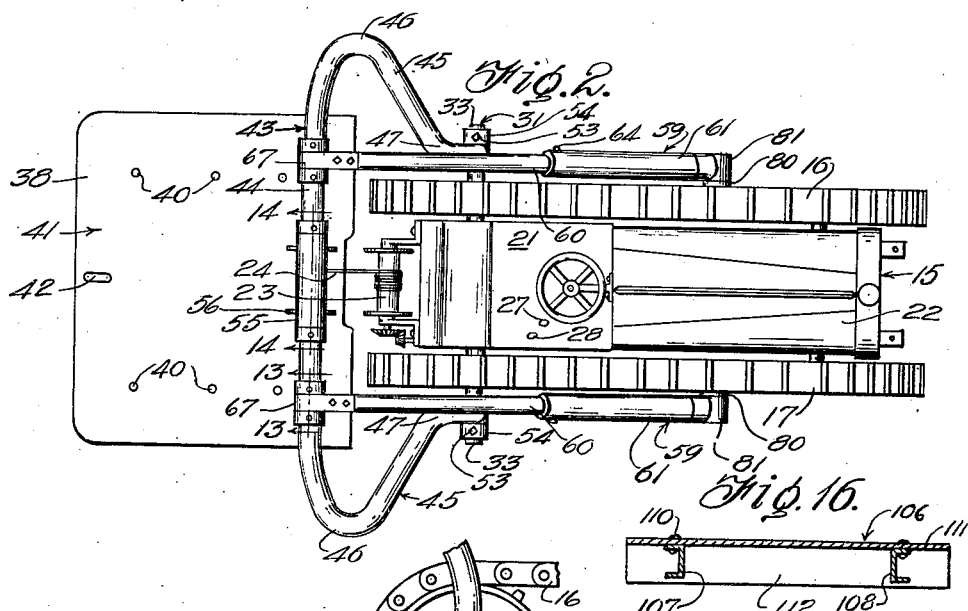
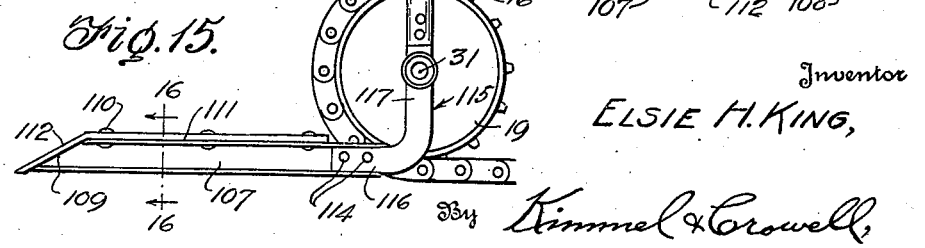
Inventor
ELSIE H. KING,
By Kimmel & Crowell
Attorneys.

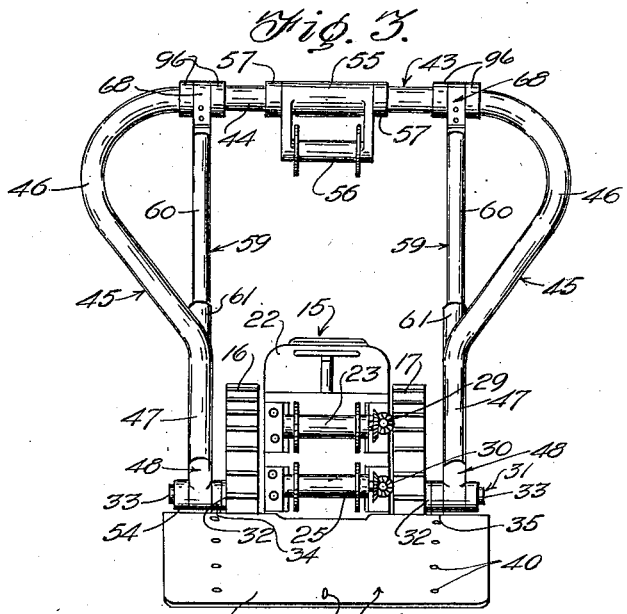
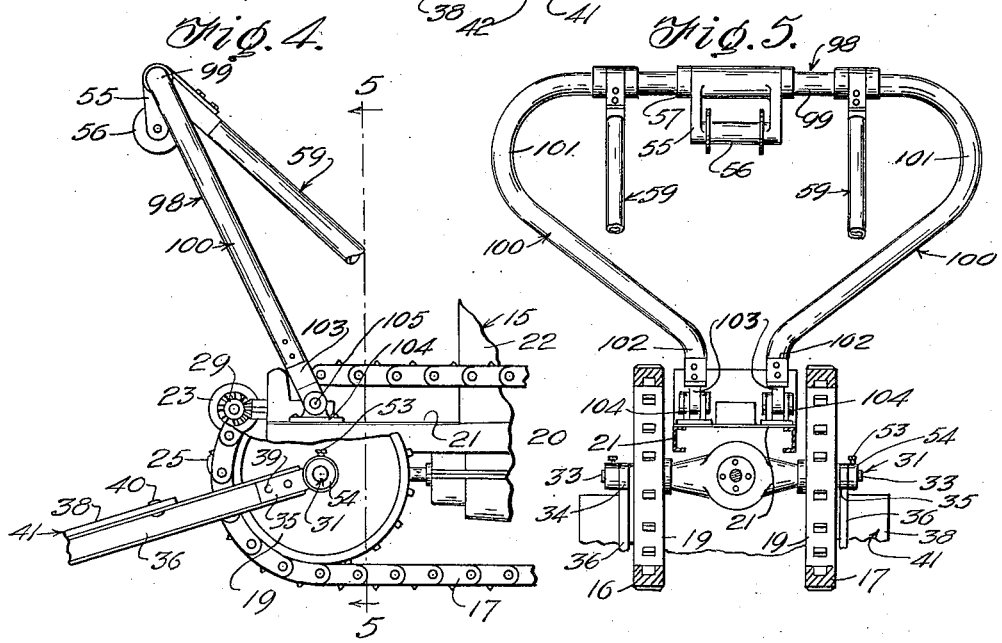

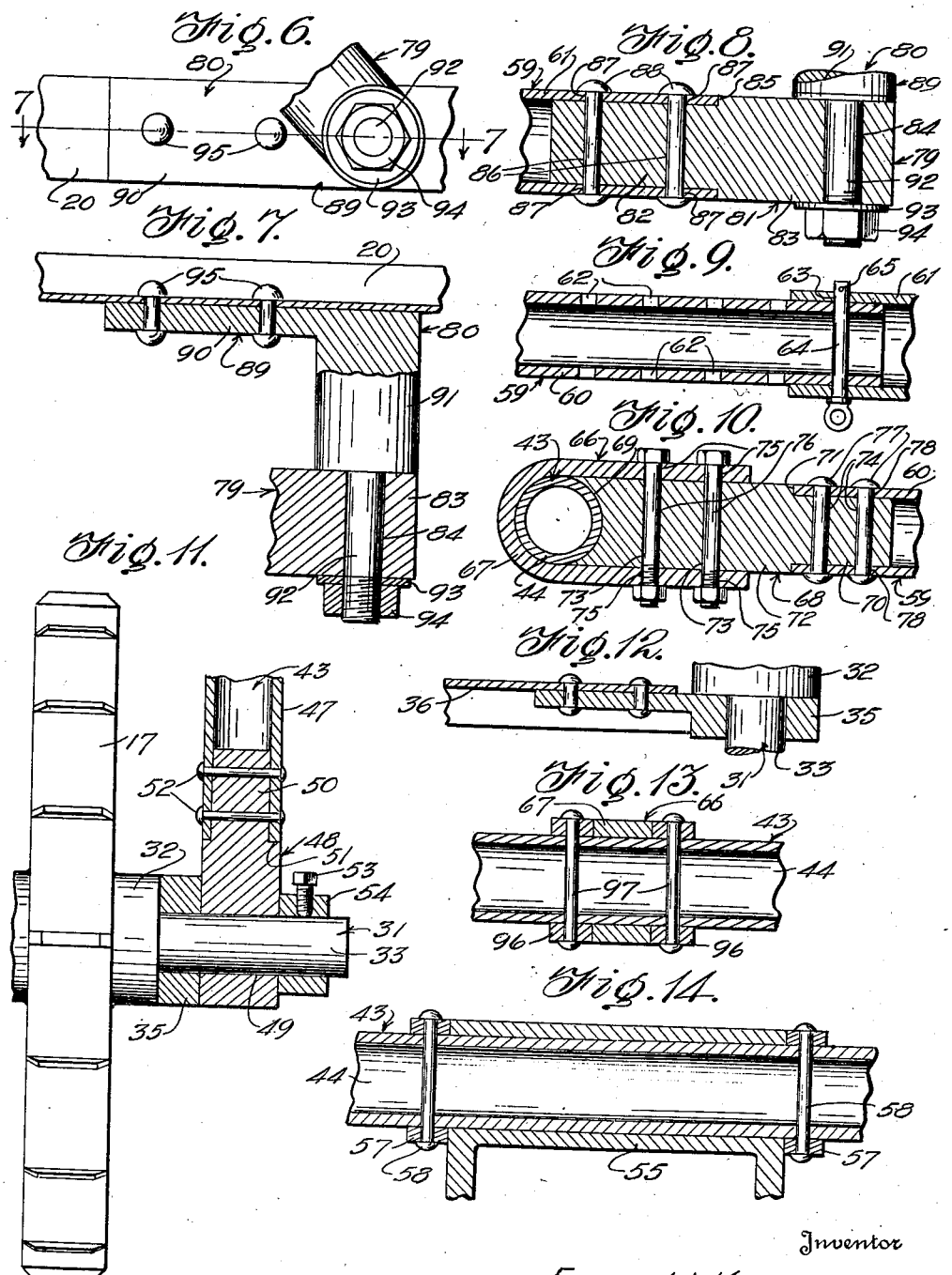

Patented Sept. 27, 1938

2,131,402

UNITED STATES PATENT OFFICE 2,131,402

LOGGING APPARATUS

Elsie H. King, South Bend, Wash.

Application November 5, 1937, Serial No. 173,023

5 Claims. (Cl. 214—85)

This invention relates to a logging apparatus, more particularly to a mobile structure for towing, pulling, hauling or dragging logs.

The invention has for its object to provide, in a manner as hereinafter set forth, an apparatus of the class referred to including means providing for the easy towing, pulling, hauling or dragging of the log or logs out of the woods.

A further object of the invention is to provide, in a manner as hereinafter set forth, an apparatus of the class referred to including means to eliminate hang-ups of the log or logs during towing, pulling, hauling or dragging thereof thereby resulting in a satisfactory transportation of the log or logs through rough and stumpy country.

A further object of the invention is to provide, in a manner as hereinafter set forth, an apparatus for the purpose referred to including means for elevating, coupling and supporting the forward end terminal portion of the log or logs thereon thereby greatly facilitating the towing, pulling, hauling or dragging thereof from point to point when desired.

A further object of the invention is to provide, in a manner as hereinafter set forth, an apparatus for the purpose referred to including means for elevating and packing thereon and in coupled relation thereto the forward end terminal portion of a log or logs whereby the towing, pulling, hauling and dragging thereof from point to point is expedited.

A further object of the invention is to provide, in a manner as hereinafter set forth, a mobile structure for the purpose set forth including a tractor, a support for the forward end terminal portion of the log in the form of a drag when supporting the log during the towing, pulling, hauling or dragging of the latter, and capable of being shifted to and sustained in non-drag position, when not in use to prevent it interfering with the travel of the tractor when the latter is not towing a log.

Further objects of the invention are to provide, in a manner as hereinafter set forth, an apparatus for the purpose referred to which is comparatively simple in its construction and arrangement, strong, durable, compact, readily assembled, conveniently operated for coupling a log therewith and supporting the log thereon, thoroughly efficient in its use, and comparatively inexpensive to manufacture.

With the foregoing and other objects in view, the invention consists of the novel construction, combination and arrangement of parts, as will be more specifically referred to and are as illustrated in the accompanying drawings, but it is to be understood that changes, variations and modifications may be resorted to which fall within the scope of the invention as claimed.

In the drawings:—

Figure 1 is a side elevation of a logging apparatus in accordance with this invention, Figure 2 is a top plan view thereof, Figure 3 is a rear elevation thereof, Figure 4 is a fragmentary view in side elevation of a modified form, Figure 5 is a section on line 5—5 in Figure 4, Figure 6 is a fragmentary view of one side of the frame of the tractor, Figure 7 is a section on line 7—7 in Figure 6, Figure 8 is a section on line 8—8 in Figure 1, Figure 9 is a section on line 9—9 in Figure 1, Figure 10 is a section on line 10—10 in Figure 1, Figure 11 is a section on line 11—11 in Figure 1, Figure 12 is a section on line 12—12 in Figure 1, Figure 13 is a section on line 13—13 in Figure 2, Figure 14 is a section on line 14—14 in Figure 2, Figure 15 is a fragmentary view in side elevation of a modified form of support or platform for the forward end terminal portion of the log, and Figure 16 is a section on line 16—16, Figure 15.

The apparatus includes a tractor 15 of that type consisting of a pair of endless articulated treads or tracks 16, 17 driven from a front pair and a rear pair of sprocket wheels 18, 19 respectively. The tractor frame is indicated at 20 and a part thereof is in the form of a floor 21 for the operator. The floor is arranged rearwardly on the engine or motor 22 and has supported thereon an upper drum 23 for an elevating cable 24 and a lower drum 25 for a towing, pulling, hauling or dragging cable 26. The drums 23, 25 are driven from the engine 22 and suitable clutching means not shown operated from the levers 27, 28 are provided for selectively throwing the drums into action. The means for driving the drum 23 from the engine is indicated at 29 and the means for driving the drum 25 from the engine is indicated at 30. The means, not shown which associates with the levers 27, 28 are in the form of clutches disposed in relation to the means 29, 30.

The axle 31 for the sprocket wheels 19 is extended laterally from the hubs 32 of said wheels as indicated at 33 and with reference to Figures 1, 2, 3 and 11 the extended portions 33 of the axle 31 have pivotally mounted thereon rearwardly extending bearing members 34, 35 anchored to a pair of spaced parallel, only one shown, rearwardly extending channel irons 36 having their outer ends beveled as at 37. Secured upon the channel irons 36 and spaced from the sprocket wheels 19 in rearward relation is a metallic plate 38. The holdfast means for securing the bearing members 34, 35 to the channel irons 36 are indicated at 39. The holdfast means employed for securing the plate 38 to the channel irons 36 are indicated at 40. The plate 38 extends rearwardly from the ends 37 of the channel irons 36. The elements 34, 35, channel irons 36 and plate 38 provide what may be termed a support or platform 41 for the forward end terminal portion of a log, and such support is in the form of a drag when supporting the log during the towing, pulling, hauling or dragging of the latter and is capable of being shifted to and sustained in non-draft position when not in use, to prevent it interfering with the travel of the tractor when the latter is not towing a log. The plate 38 in proximity to its rear edge is formed with an opening 42 for connecting it to the elevating cable 24 for the purpose of elevating the support 41 from its position shown in Figures 1 and 2 or in other words of shifting it from drag to non-drag position. The members 34, 35 are arranged in juxtaposition to the outer ends of the hubs 32 of the sprocket wheels 19.

With reference to Figures 1, 2, 3 and 11, an adjustable inverted yoke shaped element is shown and generally indicated at 43. The latter suspends the elevating cable 24, controls the height of the lift with respect to the log, is of tubular form and includes a top part 44 and a pair of oppositely disposed side parts 45 formed of an out curved upper portion 46 and a vertical lower portion 47, of less length than the portion 46. The upper end of the portions 46 merge into the ends of the part 44. Connected to the portions 47 of the sides 45 are combined coupling and bearing members 48 provided in proximity to the lower ends with transverse openings 49 and having their upper portions 50 reduced to form the members 48 intermediate their ends with shoulders 51 (Figure 11). The reduced portions 50 extend up into the portions 47 of the side parts 45 and are fixedly secured to these latter by the holdfast means 52. The bottom edges of the portions 57 of the sides 45 abut the shoulders 51. The members 48 are mounted on the extended ends of the axle 31. One of the members 48 is positioned against the member 34 and the other member 48 is positioned against the member 35 on the axle 31. Secured to the axle 31 by the binding screws 53 are collars 54 which retain the members 34, 35 and 48 on the axle 31 (Figure 11).

Loosely mounted upon the part 44 of the yoke 43 is a hanger 55 having revolubly mounted on its lower end a flanged idler roller 56. The hanger 55 is retained from lengthwise shifting relative to the part 44 of the yoke 43 by a pair of spaced collars 57 which are secured to the part 44 by the holdfast means 58 (Figure 14) and through which passes the elevating and lowering cable 24 over the roller 56.

The element 43 is adjusted at varying inclinations on the axle 31 with respect to the rear of the tractor by a pair of upstanding rearwardly extending combined bracing, retaining and adjusting elements 59 therefor (Figures 1, 2, 3 and 6 to 10). Each of the elements 59 is of like form and each of which has its lower portion spaced from the side of the tractor frame 20. Each element 59 includes a tubular upper section 60 and a tubular lower section 61. The section 60 telescopes within the section 61 and is of greater length than the length of the latter. The section 60 has its lower portion formed with spaced pairs of aligned openings 62. The section 61 at its upper end is formed with a pair of aligned openings 63 with which the pairs of openings 62 are to selectively align. The section 60 is movable to and from section 61 to provide for the adjustability of section 60 and after the latter has been adjusted, one of the pairs of openings 62 aligns with the pair of openings 63, and extending through said pairs of aligning openings is a headed pin 64 formed with an opening 65 for the passage of a removable cotter, not shown which retains pin 64 in its position relative to sections 60 and 61. When the pin 64 is in the position shown in Figure 9, the section 60 is retained in its adjusted position.

Each of the elements 59 includes a combined bearing and pivotal connection means 66 (Figures 10 and 11) between it and an end of the part 44 of the element 43. The means 66 consists of a strap 67 of U-form which straddles part 44 of element 43, a bearing member 68 having a concave upper edge 69, a reduced lower part 70, a peripheral shoulder 71 at the inner end of the non-reduced part 72, a pair of spaced parallel openings 73 formed transversely of part 72, a pair of spaced parallel openings 74 formed transversely of part 70, two spaced pairs of aligned openings 75 provided in the sides of the strap 67, holdfast means 76 and holdfast means 77. The part 70 extends into the upper end of section 60 and the latter is formed with openings 78 which align with the openings 74. The upper end edge of section 60 abuts the shoulder 71. Extending through the aligned openings 74, 78 are the holdfast means 77. The part 72 is extended between the sides of strap 67 to an extent whereby the openings 73 will align with the openings 75. Extending through the aligned openings 73, 75 are the holdfast means 76. The edge 69 of member 68 is arranged at one side of part 44 of element 43 and the bend 79 of the strap 67 is arranged at the opposite side of said part 43.

Each of the elements 59 includes a combined bearing and pivotal connection means 79 (Figure 8) for its lower end. Each of the said means 79 is for coaction with a combined pivot forming and coupling element 80 which is anchored to and extends laterally from a side of the tractor frame 20. The means 79 consists of a bearing member 81 formed of a reduced upper part 82 and a non-reduced lower part 83 provided near its lower end with a transverse opening 84. At the upper end of part 83 the member 81 has a peripheral shoulder 85. The part 82 intermediate its ends is provided with a pair of spaced parallel openings 86 transversely thereof. The part 82 extends into the lower end of section 61 and the latter is formed with spaced pairs of aligned openings 87 (Figure 8) which align with the openings 86. Extending through the aligned openings 86, 87 are holdfast means 88. The lower end edge of section 61 abuts the shoulder 85.

The elements 80 are of like form and each consists of an angle-shaped body part 89 formed of a flat inner leg 90 disposed lengthwise of the outer face of a side of frame 20, a rear leg 91 of circular cross section extending outwardly at right angles to the rear end of leg 90. The leg 91 has a reduced outer end portion 92 providing a pivot for the lower end of an element 59. The pivot 92 extends through and projects laterally from the opening 84 in the part 83 of member 81. Positioned on pivot 92 and bearing against the outer side of part 83 is a washer 93. Threadedly engaging with pivot 92 is a retaining nut 94. The washer 93 is interposed between part 83 and washer 93. The leg 90 is anchored to the frame 20 by the holdfast means 95.

To prevent each of the said means 66 shifting lengthwise of the part 44 of element 43 two spaced pairs of spaced collars 96 are mounted on said part 44. The collars 96 of each pair are fixed in spaced relation on part 44 by the spaced holdfast means 97 (Figure 13) extending through the collars and the part 44. A strap 67 is arranged between each pair of collars 96.

The modified form shown in Figures 4 and 5 is similar to the other form shown with this exception that the element 98 which corresponds to the element 43 is not pivotally mounted on rear axle 31, and it is also of a slightly different contour than the element 43. The element 98 is of substantially inverted yoke-shape contour and it consists of a top part 99 and a pair of oppositely disposed side parts 100 of like form. The part 99 is of greater length than part 44 of element 43. Each of the parts 100 includes an upper portion 101 upon an outwardly directed curve and a lower portion 102 of materially less length than portion 101. The portions 101 are of materially greater length than the portions 46 of element 43. The portions 102 are of materially less length than the portions 47 of the element 43 and are arranged over the floor or platform 21 of tractor 15. The body of the element 98 will be constructed in the same manner as the body of element 43, with exception as to shape. The lower ends of the portions 102 have depending therefrom combined coupling and bearing members 103 constructed and anchored to the portions 102 in a manner similar to the members 48 with respect to the portions 47 of element 43. Anchored on the floor or platform 21 of tractor 15 is a pair of upstanding bifurcated brackets 104 into which extend the bearing members 103. The brackets 104 carry pivots 105 for pivotally connecting the members 103 therewith. Otherwise than as stated the modified form would be the same as the other form referred to.

The elevating cable 24, as well as the towing cable 26, are of any suitable form and are provided at their outer ends respectively with hooks 106, 107 for connecting the stretches thereof in encompassing relation with respect to the forward terminal portion of a log or logs whereby the log or logs will be coupled with cable 24 when elevating their forward ends or coupled to the towing cable when the log or logs are hauled on the driving of the tractor.

The cable 24 is provided for elevating the forward end terminal of a log or logs for packing on the support 41 which has been set in drag position to receive same, and after being packed the said terminal portion will be maintained in an elevated position. After the lift to position the log or logs on support 41, the towing cable 26 is connected up with respect to the log or logs to couple it or them to the tractor 15. The latter is then driven for the purpose of towing the log or logs to the point desired. After the log or logs have been lifted to position on support 41, the cable 24 may or may not be disconnected. When lifting, if desired, the towing cable 26 may or may not be coupled to the log or logs.

The hook 106 provides for connecting support 41 to cable 24 to provide for elevating the support from drag position with respect to tractor 15 when the latter is not employed for towing the logs. The support when active inclines from its forward to its rear with respect to the rear axle of the tractor.

With reference to Figures 15 and 16, a modified form of support or platform for the forward end terminal portion of the log is shown. The support when active is disposed flatwise throughout on the ground, that is to say, horizontally and not at an inclination, such as the support 41 when the latter is active. The support is elevated from its rear end when not active.

The support includes a pair of oppositely disposed spaced parallel channel irons 107, 108 having their rear ends 109 bevelled in an opposite direction with respect to the bevel of the rear ends of the channel irons 36 of the support 41. Secured upon the channel irons 107, 108, by the holdfast means 110 is a metallic plate 111 having a down-turned rear end terminal portion 112 mounted against and secured to the said bevelled ends 109. The channel irons 107, 108 extend forwardly from the forward end 110 of plate 111 and have secured in the channels thereof, by the holdfast means 114 combined coupling and bearing angle-shaped elements or members 115 of like form. Each element consists of a pair of legs 116, 117 disposed in angular relation. The legs 116 are secured to the angle irons 115. The legs 117 are pivotally mounted and secured on the axle 31 in the same manner as the members 34, 35. The plate 111 will be formed with an opening similar to and for the same purpose as the opening 42 in plate 38 of support 41.

What I claim is:

1. In an apparatus for the purpose set forth, a mobile structure of the tractor type including front and rear axles, log elevating and towing cables for connection to the forward end of a log and a pair of selectively operable winding and unwinding drums, one for the elevating and the other for the towing cable, a rearwardly extending support for the elevated forward end of a log, said support being pivotally mounted at its forward end and capable of being disposed at a downward inclination from front to rear with respect to said structure to dispose it in drag-like form, an upstanding adjustable combined lift controlling and elevating cable suspension element pivotally supported at its lower end and carried by said structure from the rear axle, and an upstanding lengthwise adjustable combined bracing and adjusting means for, arranged forwardly of, and connected at its upper end to the upper end of said element, said bracing means being pivotally supported at its lower end from said structure near the front axle.

2. In an apparatus for the purpose set forth, a mobile structure of the tractor type including a rear axle, log elevating and towing cables for connection to the forward end terminal portion of a log and a pair of selectively operable winding and unwinding superposed drums back of the rear axle, one for the elevating and the other for the towing cable, a rearwardly extending support for the elevated forward terminal portion of a log, said support being pivotally connected at its forward end with and capable of being disposed at a downward inclination from front to rear with respect to said structure to dispose it in drag-like form, an upstanding adjustable combined lift controlling and elevating cable suspension element pivotally supported at its lower end and carried by said structure, and an upstanding lengthwise adjustable combined bracing and adjusting means for, arranged forwardly of, and connected at its upper end to the upper end of said element, said bracing means being pivotally supported at its lower end from said structure, and said element being of enlarged inverted yoke shaped form and having its enlarged top provided with a suspended idler roller over which passes the elevating cable.

3. In an apparatus for the purpose set forth, a mobile structure of the tractor type including a rear axle, log elevating and towing cables for connection to the forward end terminal portion of a log and a pair of selectively operable winding and unwinding drums, one for the elevating and the other for the towing cable, a rearwardly extending support for the elevated forward end terminal portion of a log, said support being pivotally mounted at its forward end to and capable of being disposed at a downward inclination in drag-like form with respect to said structure, an upstanding angularly adjustable combined lift controlling and elevating cable suspension element pivotally supported at its lower end and carried by said structure on the rear axle, and an upstanding lengthwise adjustable combined bracing and adjusting means for, arranged forwardly of, and connected at its upper end to said element and having its lower end pivotally supported from said structure, and said elevating cable and support having coacting means for elevating the latter off the ground.

4. In an apparatus for the purpose set forth, a mobile structure of the tractor type including a rear axle, log elevating and towing cables for connection to the forward end terminal portion of a log and a pair of selectively operable winding and unwinding drums, one for the elevating and the other for the towing cable, a rearwardly extending support for the elevated forward terminal portion of a log, said support being pivotally mounted at its forward end at spaced points on said axle and capable of being disposed at a downward inclination from front to rear with respect to said structure to dispose it in drag-like form, an upstanding adjustable combined lift controlling and elevating cable suspension element pivotally supported at its lower end and carried by said structure, and an upstanding lengthwise adjustable combined bracing and adjusting means for, arranged forwardly of, and connected at its upper end to the upper end of said element, said bracing means being pivotally supported at its lower end from said structure, and said elevating cable and support having coacting means for elevating the latter off the ground.

5. In an apparatus for the purpose set forth, a mobile structure of the tractor type including front and rear wheels, a front and rear axle, log elevating and towing cable for connection to the forward end terminal portions of a log and a pair of selectively operable winding and unwinding drums, one for the elevating and the other for the towing cable, a rearwardly extending support for the forward end terminal portion of a lifted log, said support being pivotally mounted at its forward end at spaced points on said rear axle and capable of being disposed at a downward inclination from its forward to rear and with respect to said structure for arranging in drag-like position, an upstanding adjustable combined lift controlling and elevating cable suspension element pivotally supported at its lower end on said rear axle, and said elevating cable and support having coacting means for elevating the latter from off the ground, an upstanding lengthwise adjustable combined bracing and adjusting means pivoted near the front wheels for, and connected at its upper end to the upper end of said element, and means extending laterally from said structure for pivotally supporting the lower end of said supporting means.

ELSIE H. KING.